United States Patent Office 3,338,941
Patented Aug. 29, 1967

3,338,941
ALKALI METAL DERIVATIVES OF PHOSPHOLES, ARSOLES AND PYRROLS AND PROCESS THEREFOR
Emile H. Braye, Brussels, Belgium, assignor to Union Carbide Corporation, a corporation of New York
No Drawing. Filed May 19, 1964, Ser. No. 368,706
10 Claims. (Cl. 260—440)

This invention relates to metallo-organic compounds. More particularly the invention is directed to a novel process for producing alkali metal derivatives of phospholes, arsoles and pyrrols and to certain novel compounds produced by this process.

The process of this invention comprises mixing together in a hydrocarbon or hydrocarbon ether solvent (1) an alkali metal and (2) a compound represented by the formula (A) 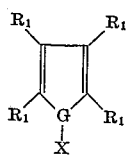

and maintaining this mixture at a temperature between about 20° C. and the boiling point of the solvent until a compound represented by the formula (B) 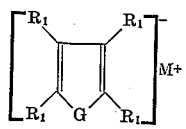

is produced.

In Formulas A and B above, G represents nitrogen, phosphorus or arsenic; M is an alkali metal, namely lithium, sodium, potassium, rubidium, cesium or francium; $R_1$ represents hydrogen or a monovalent hydrocarbon group; and X represents a phenyl, benzyl or allyl group having the following structures;

(C) 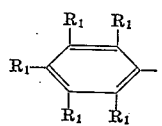

(D) 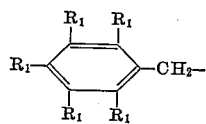

(E) 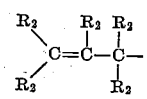

wherein $R_2$ represents hydrogen or a monovalent hydrocarbon group.

In the compounds of formulas A and B and in the substituent groups X represented by Formulas C and D above, two $R_1$ groups on adjacent carbon atoms can together represent a divalent hydrocarbon group or can together represent a portion of an aromatic ring which ring includes such adjacent carbon atoms. The various $R_1$ and $R_2$ groups can be the same or different within the same molecule. Also, the $R_1$ and $R_2$ groups can have one or more hydrogen atoms replaced by elements or functional groups which are substantially non-reactive with or in the presence of alkali metals. Preferably each $R_1$ group and each $R_2$ group is a hydrocarbon group containing from one to about 18 carbon atoms.

The $R_1$ and $R_2$ groups in Formulas A, B, C, D and E can be alkyl, aryl, aralkyl, alkaryl, alkenyl, alkynyl, cycloalkyl, cycloalkenyl, and the like groups, and two $R_1$ groups on adjacent carbon atoms can be the corresponding divalent hydrocarbon groups or can be part of an aromatic ring, for example, $R_1$ and $R_2$ can be methyl, tertiary-butyl, iso-octyl, octadecyl, phenyl, phenylethyl, terphenyl, cumyl, mesityl, vinyl, allyl, butyn-2-yl, cyclopentyl, cyclohexenyl or cycloheptyl groups, or two $R_1$ groups on adjacent carbon atoms can together be trimethylene, tetramethylene, decamethylene, $$=CH-CH=CH-CH=$$

(a portion of a six-carbon atom aromatic ring), and the like.

One or more hydrogen atoms on the $R_1$ and $R_2$ groups can be replaced by non-reactive elements or functional groups such as fluorine, —OR,

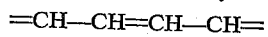

and the like, where R represents a monovalent hydrocarbon group.

The novel compounds of this invention are those represented by Formula B wherein G is phosphorus or arsenic. Typical novel compounds of this invention are those having the following formulas:

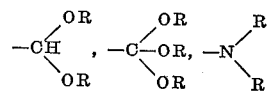

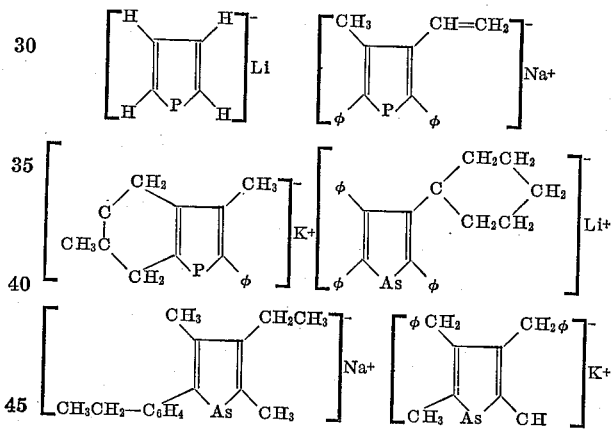

wherein $\phi$ represents the phenyl group and $C_6H_4$ represents the p-phenylene group.

The compounds of Formula A are known and can be prepared by conventional methods. Typical compounds of Formula A are those having the following formulas:

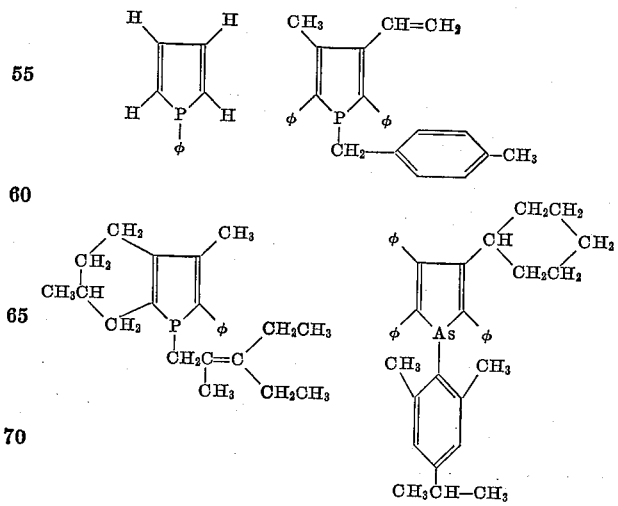

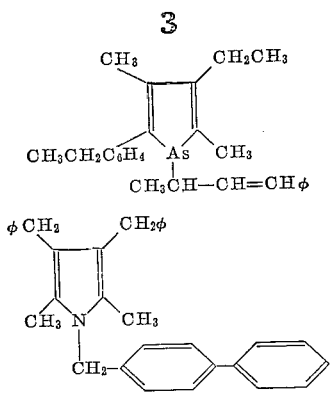

wherein φ represents the phenyl group and C₆H₄ represents the p-phenylene group.

Organic solvents useful in the process of this invention include hydrocarbons such as petroleum ether, cyclohexane, 2-ethylhexane, benzene, toluene, xylene and the like and ethers such as diethyl ether, di-isopropyl ether, methylbutyl ether, dioxane, tetrahydrofuran, ethylene glycol dimethyl ether, diethylene glycol dimethyl ether, and the like.

The solvent, compound of Formula A and alkali metal can be mixed together in any order. Generally, the compound of Formula A is combined with the solvent and the alkali metal (preferably in the form of a dispersion in a non-reactive hydrocarbon) is added thereto.

Preferably the process of this invention is carried out under anhydrous conditions and in an inert atmosphere. The inert atmosphere is conveniently provided by nitrogen, argon, helium, and the like.

The mixture of solvent, compound of Formula A and alkali metal is then maintained at a temperature between about 20° C. and the boiling point of the solvent until the chemical reaction is substantially complete. The compound of Formula B remains in solution or appears as a precipitate or solid suspension depending upon the particular solvent and the temperature. The compound of Formula B is easily recognized because of its intense color which varies from yellow through orange to violet.

Reaction rates tend to be slow at less than about 20° C., and there is no advantage in carrying out the process of this invention at temperatures above the boiling point of the solvent since this would require the use of pressure equipment. Formation of the compound of Formula B in good yield generally takes from about one hour to about eight hours, depending on the temperature, solvent and particular reactants.

A preferred temperature for the process of this invention is just above the melting point of the alkali metal where such metal also melts below the boiling point of the solvent.

Where G in Formula A is nitrogen, lithium is the preferred alkali metal; where G is phosphorus, lithium and potassium are preferred; and where G is arsenic, sodium is the preferred metal. It is also preferable to employ a slight excess of alkali metal over the stoichiometric ratio of two gram atoms of alkali metal per mole of compound of Formula A.

The compounds of Formula B are highly reactive with oxygen and water. Accordingly it is usually more convenient to maintain the compounds of Formula B as a solution or suspension in the solvent than to isolate the dry solid compound. Also because of their high reactivity the compounds of Formula B are conveniently characterized by transforming them into less reactive derivatives. This is conveniently done by allowing the compound of Formula B to react according to conventional methods with an organic chloride, bromide or iodide, as is illustrated in the examples hereinbelow.

The compounds of Formula B are all useful as intermediates in the formation of metal chelating agents, the latter being further useful in recovering metal ions from solution. For example, all compounds of Formula B react with bromo-acetic acid to form compounds of the formula (F) 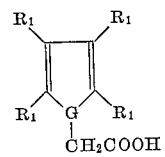

wherein $R_1$ and G have the meanings defined hereinabove with reference to Formula A. The compounds of Formula F form chelate complexes with transition metal cations, such as $Fe^{+2}$, $Ni^{+2}$, $Co^{+2}$, $Cr^{+3}$, $Cu^{+2}$, $Fe^{+3}$ and the like. The compound of Formula F is added to an aqueous solution containing the transition metal cation, mixed thoroughly, and then the chelate complex is separated from the mixture by extraction with an organic solvent.

The following examples are presented. All melting points are in °C.

Example 1

A mixture of 0.53 g. of potassium and 2 g. of 1,2,5-triphenylphosphole in 60 ml. of dioxan was refluxed under efficient stirring in a nitrogen atmosphere. The mixture became first violet and then brownish violet. A brown-violet precipitate of potassium 2,5-diphenylphosphacyclopentadienide was formed.

After cooling at room temperature, one ml. of methyl iodide was added slowly and the mixture stirred for one hour. Dilute aqueous acetic acid (200 ml.) was added, followed by methylene chloride (200 ml.). The dried organic layer was chromatographed on silica gel. The band eluted with $CCl_4$ gave 0.67 g. (40% calc. on triphenylphosphole) of 1-methyl-2,5-diphenylphosphole, giving yellow crystals of M.P. 110–111° (from methanol)

*Analysis.*—Found: C, 80.98; H, 5.86. Calc. for $C_{17}H_{15}P$: C, 81.60; H, 6.04.

Example 2

A suspension of pentaphenylphosphole (10 g., 21.5 millimoles) and potassium (1.82 g., 46.5 mmoles) in 120 ml. of pure dioxane was refluxed for 4 hours under efficient stirring in a introgen atmosphere. The violet solution was cooled and the potassium 2,3,4,5-tetraphenylphosphacyclopentadienide precipitated as small violet crystals.

The suspension of this potassium salt was added slowly under stirring to a solution of 55.6 g. (300 mmoles) of 1,2-dibromoethane in dry dioxane. The discoloration was almost instantaneous. The reaction mixture was evaporated to dryness and the residue taken up with water and methylene chloride. Chromatography of the dried organic layer on silica gel gave 7.8 g. (73% calc. on φ₅C₄P) of 1-2′-bromoethyl-2,3,4,5-tetraphenylphosphole, yellow fluorescent needles of M.P. 217–219° (from $CH_2Cl_2/CH_3OH$).

*Analysis.*—Found: C, 72.9; H, 4.93. Calc. for $C_{30}H_{24}BrP$: C, 72.73; H, 4.89.

Example 3

A 30% by weight lithium dispersion in petroleum jelly (0.6 g.) and 5 g. of pentaphenylphosphole were stirred in 75 ml. of tetrahydrofuran for 4.5 hours at room temperature to yield lithium 2,3,4,5-tetraphenylphosphacyclopentadienide.

The resulting violet solution was added dropwise to a tetrahydrofuran solution of 10.1 g. of 1,3-dibromopropane. After one hour stirring, dilute acetic acid and methylene chloride were added and the organic layer, washed several times with water and dried, was chromatographed on silica gel. The first fraction, eluted with methylene chloride gave 4.7 g. (85% yield) of pale yellow crystals (M.P. 185–195°) of 1,3′-bromopropyl-2,3,4,5-tetraphenylphosphole; recrystallization from $CH_2Cl_2/C_2H_5OH$ raised the M.P. to 205–206°.

*Analysis.*—Found: C, 72.99; H, 5.515. Calc. for C₃₁H₂₆BrP: C, 73.08; H, 5.14.

Example 4

A suspension of 0.55 g. of a 30% by weight lithium dispersion in petroleum jelly, and 5 g. of pentaphenylphosphole in 100 ml. of tetrahydrofuran was stirred for 24 hours at room temperature to yield lithium 2,3,4,5-tetraphenylphosphacyclopentadienide.

The red-violet solution was added slowly to a solution of 8.8 ml. of 1,5-dibromopentane in tetrahydrofuran. After half an hour, the reaction product was separated by the procedures of Example 3 above. The yellow 1,5′-bromopentyl-2,3,4,5-tetraphenyl phosphole (51% yield) crystallized with one mole of benzene per mole of compound and melted at 132–135°.

*Analysis.*—Found: C, 76.3; H, 5.78. Calc. for C₃₃H₃₀BrP·C₆H₆: C, 76.16; H, 5.90.

Example 5

1-phenylphosphafluorene,

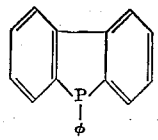

(3 g., 11.5 mmoles) was shaken for 2½ hours with an excess of lithium shavings in 50 ml. of tetrahydrofuran. The excess of Li shavings were removed with tweezers from the brownish yellow solution and 1.25 ml. (11.5 mmoles) of t-butyl chloride was added in order to destroy the phenyl-lithium formed. After 10 min. refluxing, the brownish shade disappeared leaving a clear intense yellow solution of lithium dibenzophosphacyclopentadienide,

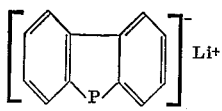

After cooling at room temperature, 2.9 g. (11.6 mmoles) of p-bromobenzyl bromide, dissolved in tetrahydrofuran, was added. The colorless solution was evaporated to dryness, the residue taken up in benzene and the filtered benzene solution evaporated to dryness, giving 4 g. (86.5% yield) of colorless crystals of 1-p-bromobenzylphosphafluorene; after three crystallizations from ethanol the crystals melted at 123.5–123.6°.

*Analysis.*—Found: C, 64.99; H, 4.02; Br, 22.73. Calc. for C₁₉H₁₄BrP: C, 64.60; H, 3.99; Br, 22.62.

Example 6

Pentaphenylpyrrole (2 g., 4.47 mmoles) and 1 g. of lithium shavings were stirred in 100 ml. of tetrahydrofuran for 3 hours at room temperature. The excess of lithium was removed with tweezers and 0.487 ml. (4.47 mmoles) of t-butyl chloride were added in order to destroy the by-product phenyl lithium. The originally brown color turned to brownish orange after 10 minutes of reflux. Hydrolysis of the lithium 2,3,4,5-tetraphenylpyrrolide gave a yellow solution; the methylene chloride extracts were washed with water and then dried over Na₂SO₄. Evaporation of the filtered solution left a residue which recrystallized from hot ethanol, yielded 1.03 g. (63.5%) of colorless crystals of 2,3,4,5-tetraphenylpyrrole, M.P. 214° C. The product was further identified by comparison of its infrared spectrum with that of a sample known to be authentic.

Example 7

Pentaphenylarsole (pentaphenylarsacyclopentadiene, 1 g.) and 0.6 g. of sodium were refluxed for 15 hours in 100 ml. of toluene under efficient stirring. The sodium 2,3,4,5-tetraphenylarsacyclopentadienide formed a greyish brown suspension. Methyl iodide was added to the cooled reaction mixture; after 0.5 hour ethanol was added slowly in order to destroy the excess of sodium. The reaction mixture was evaporated to dryness, extracted with benzene, and the products purified by chromatography on silica gel. The fraction eluted with benzene gave 0.6 g. (68% yield) of 1-methyl-2,3,4,5-tetraphenylarsole, M.P. 212–212.5° (from benzene/light petroleum).

*Analysis.*—Found: C, 77.69; H, 5.10. Calc. for C₂₉H₂₃As: C, 78.01; H, 5.20.

Example 8

Pentaphenylphosphole (5.4 g., 11.6 mmoles) and 0.9 g. (23 mmoles) of potassium were stirred in 50 ml. of boiling dioxane for 3.5 hours. The intense violet solution of potassium 2,3,4,5-tetraphenylphosphacyclopentadienide gave violet crystals upon cooling. To this suspension 6 ml. of ethyl bromoacetate were added and the mixture refluxed for 0.5 hour. After the removal of most of the dioxane, water, some acetic acid and methylene chloride were added to the residue, the organic layer washed with water, dried on Na₂SO₄ and the filtered solution evaporated. The benzene solution of the residue was passed over a silica gel column and the fraction eluted with benzene gave 2.7 g. (49%) of ethyl 2,3,4,5-tetraphenylphospholyl-1-acetate, yellow crystals of M.P. 157–158° (from ethanol or methanol).

*Analysis.*—Found: C, 80.07; H, 5.68. Calc. for C₃₂H₂₇O₂P: C, 80.95; H, 5.73.

About 0.5 g. of this ester was hydrolyzed by refluxing with 0.5 g. of potassium hydroxide in 30 ml. of ethanol and 5 ml. of water. The mixture was acidified by means of dilute aqueous hydrochloric acid. The pale yellow precipitate of 2,3,4,5-tetraphenylphospholyl-1-acetic acid was filtered off and recrystallized from benzene/light petroleum, gave yellow needles of M.P. 210–212°.

*Analysis.*—Found: C, 80.29; H, 4.77. Calc. for C₃₀H₂₃O₂P: C, 80.69; H, 5.20.

When an aqueous Cu⁺⁺ salt solution was treated with the above acid, the Cu-chelate was easily extracted with an organic solvent such as methylene chloride or ethyl acetate. The Cu-chelate was a greenish yellow fluorescent material of M.P. 180–200°.

What is claimed is:

1. The process which comprises (1) mixing together in a solvent selected from the class consisting of hydrocarbons and hydrocarbon ethers (a) an alkali metal and (b) a compound represented by the formula

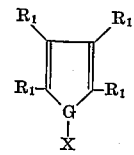

wherein G is selected from the class consisting of nitrogen, phosphorus and arsenic, X is selected from the class consisting

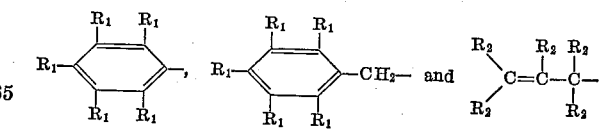

R₁ and R₂ are each selected from the class consisting of hydrogen and monovalent hydrocarbon groups containing from one to about 18 carbon atoms, and two R₁ groups on adjacent carbon atoms can together form a structure selected from the class consisting of divalent hydrocarbon groups and a portion of an aromatic ring which includes said adjacent carbon atoms, and (2) maintaining said mixture at a temperature between about 20° C. and the boiling point of said solvent until formation of a compound represented by the formula

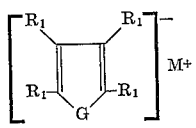

wherein $R_1$ and G have the meanings defined hereinabove and M is said alkali metal.

2. The process in accordance with claim 1, wherein G is phosphorus, X is the phenyl group and the solvent is tetrahydrofuran.

3. The process for producing potassium 2,3,4,5-tetraphenylphosphacyclopentadienide which comprises heating a mixture of potassium, pentaphenylphosphole and tetrahydrofuran solvent at the boiling point of said solvent.

4. The process for producing sodium 2,3,4,5-tetraphenylarsacyclopentadienide which comprises heating a mixture of sodium, pentaphenylarsole and toluene solvent at the boiling point of said solvent.

5. Compounds represented by the formula

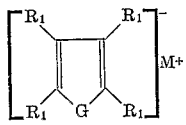

wherein G is selected from the class consisting of phosphorus and arsenic, M is an alkali metal, $R_1$ is selected from the class consisting of hydrogen and monovalent hydrocarbon groups containing from one to about 18 carbon atoms, and two $R_1$ groups on adjacent carbon atoms can together form a structure selected from the class consisting of divalent hydrocarbon groups and a portion of an aromatic ring which includes said adjacent carbon atoms.

6. The compound potassium 2,5-diphenylphosphacyclopentadienide.

7. The compound potassium 2,3,4,5-tetraphenylphosphacyclopentadienide.

8. The compound lithium 2,3,4,5-tetraphenylphosphacyclopentadienide.

9. The compound lithium dibenzophosphacyclopentadienide.

10. The compound sodium 2,3,4,5-tetraphenylarsacyclopentadienide.

References Cited

Hobbs et al.: J.A.C.S., vol. 84, pages 43 to 51, (1962).
H. S. French: Chem. Abstracts, vol. 53, page 17998 (a), 1959.

TOBIAS E. LEVOW, *Primary Examiner.*

W. F. BELLAMY, *Assistant Examiner.*